Jan. 30, 1923.

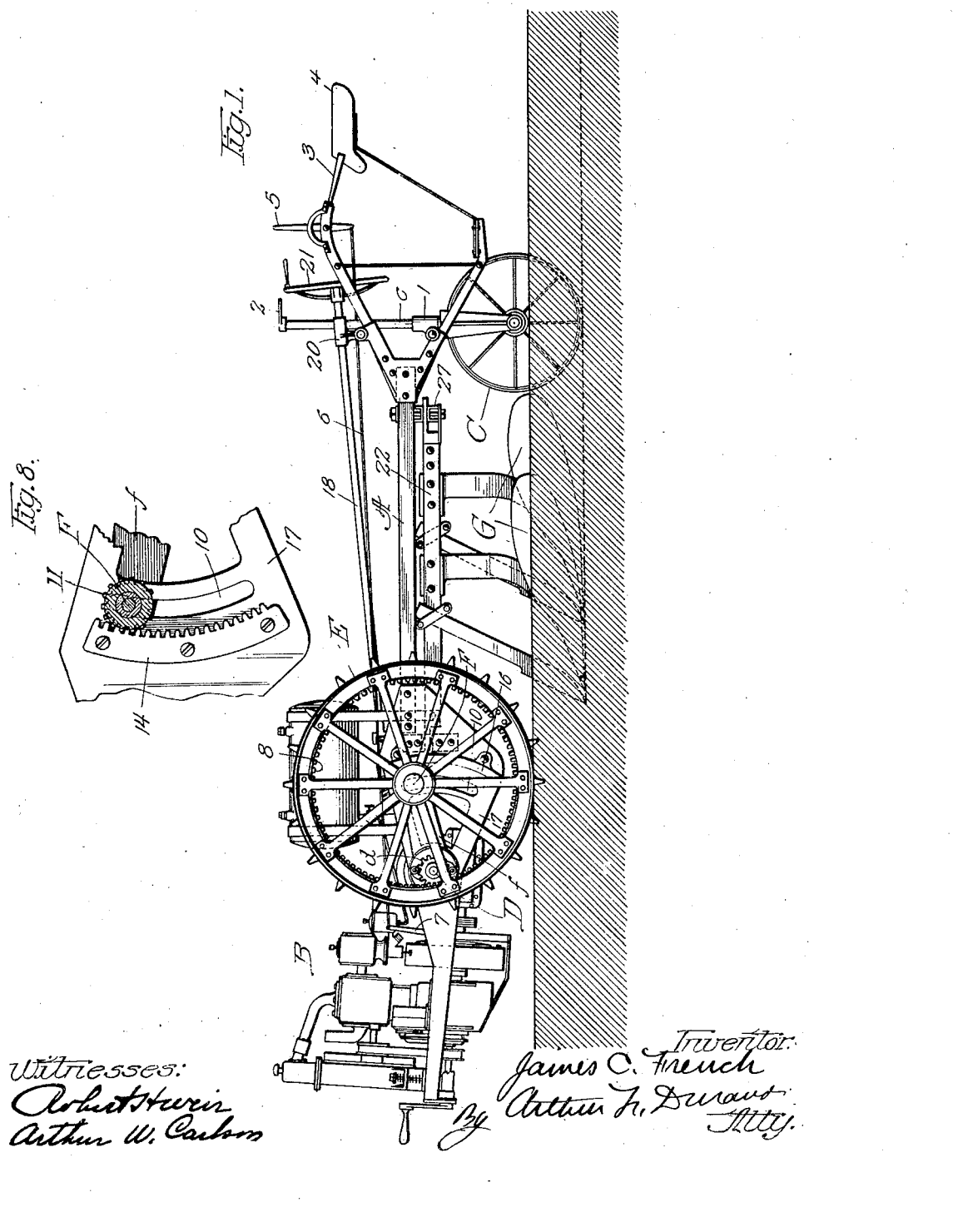

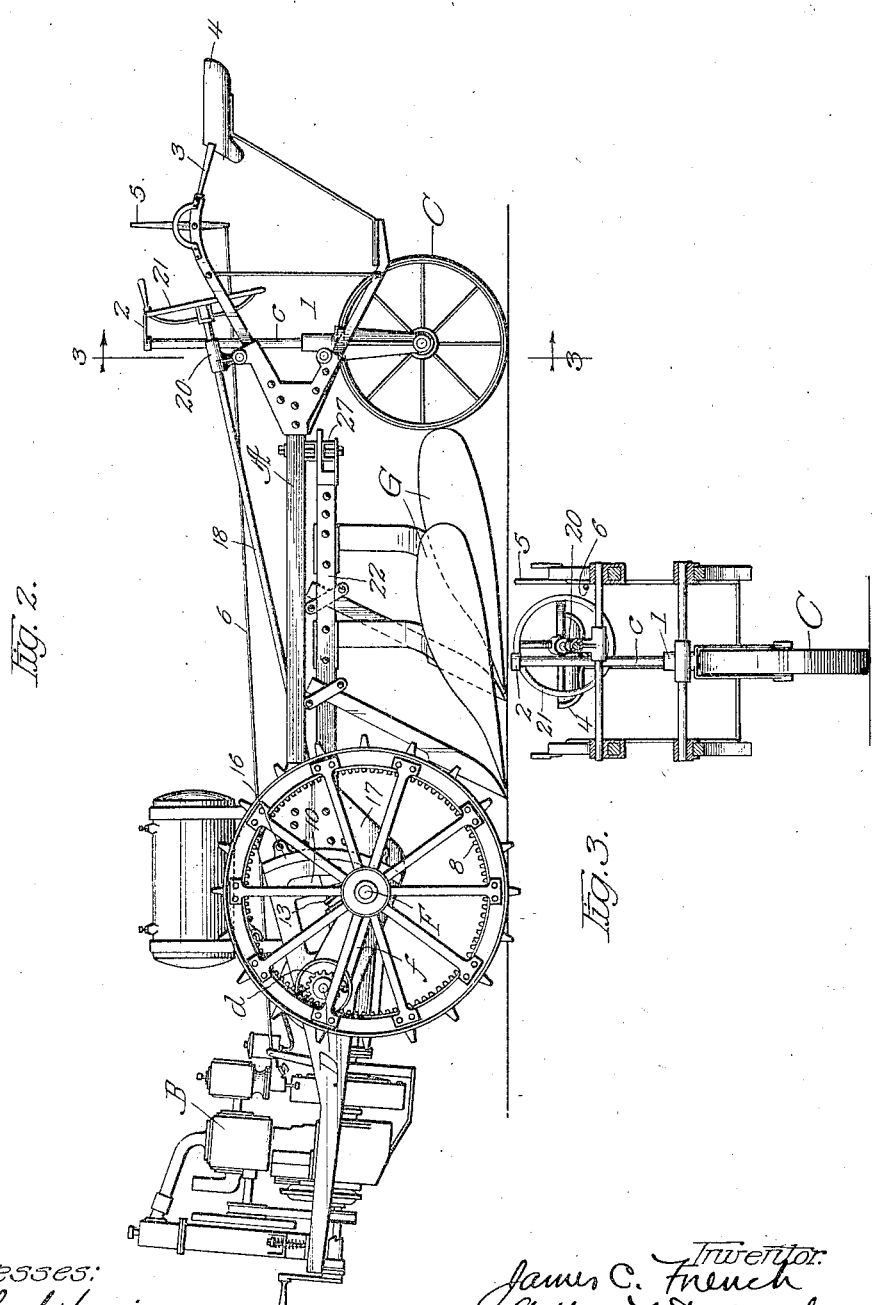

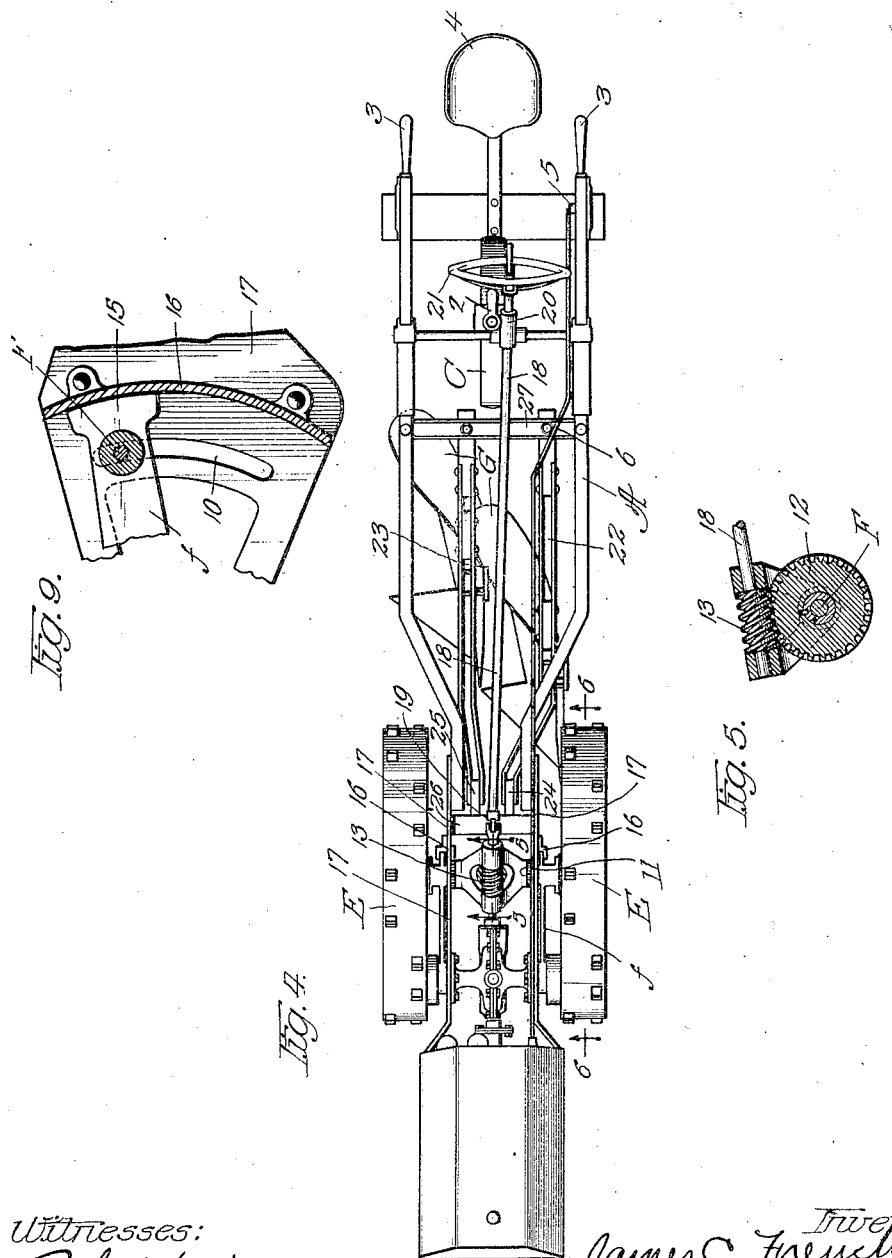

J. C. FRENCH.
TRACTOR FRAME.
FILED OCT. 18, 1917.

Patented Jan. 30, 1923.

1,443,355

UNITED STATES PATENT OFFICE.

JAMES C. FRENCH, OF CHICAGO, ILLINOIS, ASSIGNOR, BY MESNE ASSIGNMENTS, TO F. C. AUSTIN MACHINERY COMPANY, A CORPORATION OF ILLINOIS.

TRACTOR FRAME.

Application filed October 18, 1917. Serial No. 197,212.

*To all whom it may concern:*

Be it known that I, JAMES C. FRENCH, a citizen of the United States of America, and resident of Chicago, county of Cook, and State of Illinois, have invented a certain new and useful improvement in Tractor Frames, of which the following is a specification.

This invention relates to tractor plows of that kind in which the plow itself, or plow-bottom, as it is called, is supported by a frame mounted on front traction wheels, said frame taking the place of the ordinary plow-beam, and means being provided for raising and lowering the forward end portion of said frame on the traction-wheels, and the motive power, such as an internal combustion engine, being carried by the forward end of the said frame, whereby the plowing-machine thus provided is of a self-contained and unitary character.

Generally stated, the object of this invention is to provide a novel and improved tractor plow, or self-propelled plowing-machine, of the foregoing general character.

A special object is to provide an improved construction and general arangement whereby, in a tractor plow of this type, a seat is provided so that the driver may ride on the machine, and also means for steering the machine to the right or the left, so that the rider may control the direction of travel of the machine, as well as the raising and lowering of the plow-bottom out of and into the ground, from the seat thus provided.

Another object is to provide an improved construction and arrangement whereby, in a tractor-plow of this type, both front traction-wheels will travel on the top surface of the ground, neither wheel running in the furrow, so that the machine can be steered and controlled easily and in the desired manner, and will be level while traveling across country from one place to another.

It is also an object to provide certain details and features of construction and combinations tending to increase the general efficiency and desirablity of a self-propelled plowing-machine of this particular construction.

To the foregoing and other useful ends, the invention consists in matters hereinafter set forth and claimed.

In the accompanying drawings:

Fig. 1 is a side elevation of a self-propelled plowing machine embodying the principles of said invention, showing the gang-plow or double plow-bottom lowered into the ground and in position to turn the soil over when the machine moves forward.

Fig. 2 is a similar view, but showing the plow-bottoms raised to a position to permit the machine to travel from one place to another without operating in the ground, the two plow-bottoms or gang-plow being raised above the top surface of the ground.

Fig. 3 is a detail vertical section on line 3—3 in Fig. 2.

Fig. 4 is a plan of the plowing-machine shown in said Figures 1 and 2.

Fig. 5 is an enlarged detail section on line 5—5 in Fig. 4.

Fig. 8 is a detail section on line 8—8 in Fig. 7.

Fig. 9 is a detail section on line 9—9 in Fig. 7.

Figure 6:
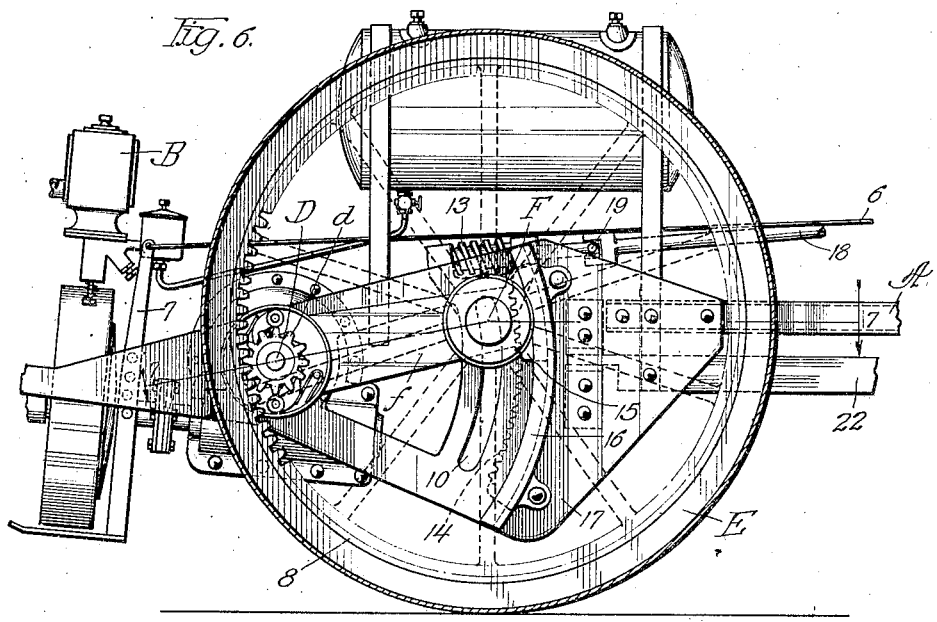
Fig. 6 is an enlarged detail section on line 6—6 in Fig. 4.
Figure 7:
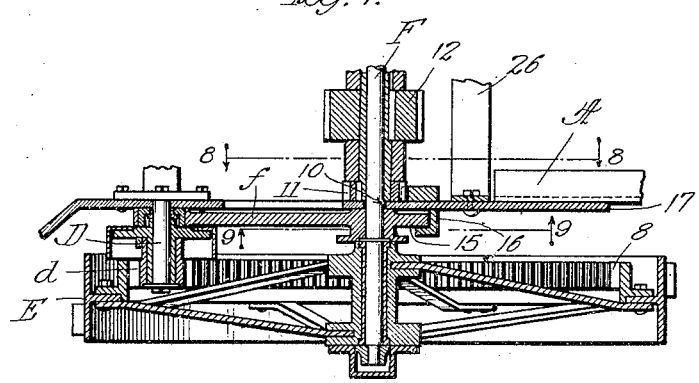
Fig. 7 is a detail section on line 7—7 in Fig. 6.

As thus illustrated, this invention comprises a body frame A which takes the place of the ordinary plow-beam, being made somewhat heavier and longer to provide a support at its forward end for the motor or engine B by which the machine is operated. At its rear end said frame is provided with a single wheel C provided with a vertical spindle $c$ mounted in bearings 1 on the frame. The upper end of this spindle is provided with a handle 2 for turning the wheel C about its vertical steering axis, so that the machine can be steered to the right or the left. The rear end of the frame A is provided with a pair of handles or clasps 3, arranged in position substantially like those of the ordinary walking plow, and a driver's seat 4 is provided and supported in position between these handles. A lever 5 is pivoted on the frame and arranged within reach of the driver and suitably connected by a rod 6 with a lever 7 on the engine, whereby the clutch or transmission is controlled to start and stop the machine. The forward portion of the frame A is provided with a transverse shaft D having pinions $d$ on the ends thereof, which pinions engage the internal gear-teeth 8 of the two traction wheels E, these pinions $d$ being connected to said shaft by ratchet devices 9, of any suitable character, so that when necessary said traction wheels E can rotate faster than the pinions $d$, as will be the case when the machine is steered abruptly to the right or the left, for in such case the traction wheel at the outside of the turn must rotate faster than the traction wheel on the inside, these ratchets taking the place, to a certain extent, of an ordinary differential gearing. The engine is suitably connected to drive the shaft D, and in this way the traction wheels E are rotated to propel the machine. Of course, the frame A must be suitably supported by the wheels E and for this purpose the axle F is mounted in suitable bearings on said frame formed in the rear ends of the swinging arms $f$, the latter having their forward ends suitably mounted on the axis provided by the shaft D, whereby the rear ends of these arms $f$ swing up and down about said axis. The side portions of the frame A are provided with segmental slots 10 curved about the axis D, and the axle F travels up and down, relatively, in these slots when the frame A is raised and lowered. To support the frame A on the axle F, pinions 11 are mounted loosely on said axle, and are connected to be rotated thereon by the worm wheel 12 which engages the worm 13 suitably arranged above. When the worm 13 is rotated, the worm wheel 12 is rotated on the axle F, and this rotates the pinions 11 on the axle. Said pinions 11 engage the segmental racks 14 which are secured to the inner sides of the frame A, and, consequently, rotation of said pinions causes said racks to move either upward or downward, thus causing the frame A to move up or down. The rear ends of the arms $f$ are preferably provided with portions 15 to engage the curved guides 16 which are secured to the outer sides of the side-plates 17 of the body frame, whereby the structure is render strong and substantial. A longitudinally disposed steering shaft 18 is connected by a universal joint 19, or in any suitable manner, with the worm 13, and is supported at its rear end by a bearing 20 suitably mounted on the body frame. The said rear end of the shaft 18 is provided with a hand-wheel 21, and by rotating this wheel, which is within easy reach of the rider occupying the seat 4, the frame A will be raised and lowered on the axle F, and relative thereto, but the rear portion of the frame will remain at the fixed height at which it is supported by the rear steering wheel C, as will be readily understood.

Anything may be carried by the frame A, but the tractor or self-propelled vehicle thus provided is designed with special reference to the solving of some of the problems involved in the successful construction and operation of a tractor-plow, and for these purposes the two plow-bottoms G, each consisting, as usual, of the ordinary plow-share and mold-board, are suitably supported on short beams 22 and 23, which are arranged parallel between the sides of the body frame. These beams 22 and 23 may be supported in any suitable manner, as by connecting their forward ends at 24 and 25 with the cross-member 26 of the main body frame. Also, the rear ends of these beams 22 and 23 can be suitably supported on a cross-member 27 on the main body frame. Preferably, as will be seen, the two traction wheels E rotate about a common axis, so that they both travel on the top surface of the ground, and the two plow-bottoms are arranged accordingly—that is to say, the two plow-bottoms cut two furrows immediately behind the two traction wheels, but when the next double furrow is cut, neither traction-wheel will travel in the previous furrow. The rear wheel C, however, travels directly behind the two plow-bottoms in the double furrow cut thereby, and with clearance at both sides of this wheel, whereby said wheel can be turned to the right or the left in an easy manner at any time to control the direction of travel of the plowing-machine as a whole.

With the foregoing construction, it will be seen, the plow-bottom, or plow-bottoms, must enter the ground point first, and must come out of the ground point first, which is desirable for reasons well-known and well-understood. With the machine standing on the top surface of the ground, as shown in Figure 2, the lowering of the frame A relative to the axle F will cause the points or toes of the two plow-bottoms to point downward and forward, and forward motion of the machine will then cause the two plows to slide forward and downward into the ground, which they will continue to do until a maximum depth is reached, which will be when the frame A is practically horizontal, and when the bottom of the rear steering wheel C is in line horizontally with the lower edges of the land-slide plates and plow-shares of the two plow-bottoms. This is called leveling the plow, and as soon as the leveling operation is complete, and the maximum depth is reached, the plow-bottoms will then move forward at the given or fixed depth required for the furrow. When the beam A is raised relative to the axle F, the front end of said frame will tilt upward, inasmuch as the steering wheel C is still down in the furrow, so that the toes or points of the plow will point upward and forward, and in this way the two plow-bottoms will slide out of the ground point first. Should it be necessary at any time to do this, the driver, while standing on the ground, can grasp the handles 3 and lift the rear end of the plowing-machine, and drag it over sidewise like an ordinary walking plow.

While the invention is shown in conjunction with an implement comprising two plows, it will be understood that the implement can be of any suitable character and for any desired purpose, without departing from the spirit of the invention.

What I claim as my invention is:

1. In a self-propelled vehicle, the combination of a body frame, front traction wheels, an axle for said wheels, means pivoted on said body frame to support said axle, so that the axle swings up and down relatively to the body frame about a transverse axis, thereby altering the angularity of said frame, pinions on said axis, gear toothed members for engaging said pinions to communicate power therefrom to said traction wheels, means for communicating power to said pinions.

2. A structure as specified in claim 1, in combination with guides on said frame for said axle, said guides being curved about said transverse axis.

3. A structure as specified in claim 1, in combination with curved guides for said pivoted means, which guides are curved about said transverse axis, and means including worm gearing on said axle and a rack and pinion for raising and lowering the body frame relatively to said axle.

4. A structure as specified in claim 1, in combination with mechanism for enabling the driver to swing the said axle up and down relatively to the body frame, thereby in effect to raise and lower the body frame.

5. A structure as specified in claim 1, in combination with a curved rack rigid with said body frame, a pinion on said axle to engage said rack, and means to enable the driver to operate said pinion for the purpose of swinging the axle up and down relatively to the body frame, thereby in effect to raise and lower the body frame.

6. In a vehicle structure, the combination of a pair of front wheels, a rear wheel, a body frame supported by said wheels and movable up and down relatively to said front wheels, in combination with mechanism for enabling the driver to raise and lower the body frame relatively to said front wheels, said mechanism comprising means pivoted on the body frame to connect the wheels therewith, so that the wheels swing up and down relatively to the body frame about a transverse axis disposed in front of the axis of the two wheels, a rack rigid with the body frame, a pinion on the axle to engage said rack, and means controllable by the driver for rotating said pinion, thereby in effect to raise and lower the body frame.

Signed by me at Chicago, Cook County, Illinois, this 3rd day of October, 1917.

JAMES C. FRENCH.